(12) United States Patent
Roth et al.

(10) Patent No.: US 8,996,860 B1
(45) Date of Patent: Mar. 31, 2015

(54) TOLERANCE FACTOR-BASED SECRET DECAY

(75) Inventors: Gregory B. Roth, Seattle, WA (US); Nicholas Alexander Allen, Seattle, WA (US); Cristian M. Ilac, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 218 days.

(21) Appl. No.: 13/593,288

(22) Filed: Aug. 23, 2012

(51) Int. Cl.
*H04L 15/16* (2006.01)

(52) U.S. Cl.
USPC ........... 713/155; 713/153; 713/168; 713/171; 726/4; 726/17; 726/21

(58) Field of Classification Search
CPC .................. H04L 63/0815; H04L 63/0807
USPC ................. 713/153, 154, 155; 726/17, 21
See application file for complete search history.

(56) References Cited

U.S. PATENT DOCUMENTS

| | | | |
|---|---|---|---|
| 7,272,379 B1 | 9/2007 | Tang et al. | |
| 7,562,382 B2 | 7/2009 | Hinton et al. | |
| 7,908,649 B1 | 3/2011 | Arora et al. | |
| 8,572,683 B2 * | 10/2013 | Radhakrishnan et al. | 726/2 |
| 8,683,056 B2 | 3/2014 | Muret et al. | |
| 8,769,655 B2 * | 7/2014 | Gould et al. | 726/9 |
| 2003/0101348 A1 * | 5/2003 | Russo et al. | 713/185 |
| 2003/0149900 A1 | 8/2003 | Glassman et al. | |
| 2004/0250076 A1 | 12/2004 | Kung | |
| 2005/0021770 A1 | 1/2005 | Helm et al. | |
| 2005/0188079 A1 | 8/2005 | Motsinger et al. | |
| 2005/0223115 A1 | 10/2005 | Hanson et al. | |
| 2006/0031503 A1 | 2/2006 | Gilbert | |
| 2006/0064464 A1 | 3/2006 | Kakivaya et al. | |
| 2006/0075133 A1 | 4/2006 | Kakivaya et al. | |
| 2008/0034424 A1 | 2/2008 | Overcash et al. | |
| 2008/0148378 A1 | 6/2008 | Wing et al. | |
| 2008/0196098 A1 * | 8/2008 | Cottrell et al. | 726/12 |
| 2008/0271121 A1 | 10/2008 | Hinton et al. | |
| 2009/0132813 A1 | 5/2009 | Schibuk | |

(Continued)

OTHER PUBLICATIONS

"Information Security"—NIST, Burr et al, Dec. 2011 http://csrc.nist.gov/publications/nistpubs/800-63-1/SP-800-63-1.pdf.*

(Continued)

*Primary Examiner* — Randy Scott
(74) *Attorney, Agent, or Firm* — Novak Druce Connolly Bove + Quigg LLP

(57) ABSTRACT

Session-specific information stored to a cookie or other secure token can be selected and/or caused to vary over time, such that older copies will become less useful over time. Such an approach reduces the ability of entities obtaining a copy of the cookie from performing unauthorized tasks on a session. A cookie received with a request can contain a timestamp and an operation count for a session that may need to fall within an acceptable range of the current values in order for the request to be processed. A cookie returned with a response can be set to the correct value or incremented from the previous value based on various factors. The allowable bands can decrease with age of the session, and various parameter values such as a badness factor for a session can be updated continually based on the events for the session.

24 Claims, 6 Drawing Sheets

(56) References Cited

U.S. PATENT DOCUMENTS

| | | |
|---|---|---|
| 2009/0328186 A1 | 12/2009 | Pollutro et al. |
| 2010/0023475 A1* | 1/2010 | Lahav .............................. 706/59 |
| 2011/0320820 A1 | 12/2011 | Wray |
| 2012/0240060 A1 | 9/2012 | Pennington et al. |
| 2012/0260310 A1 | 10/2012 | Kramarenko et al. |
| 2012/0271380 A1 | 10/2012 | Roberts et al. |
| 2012/0284767 A1 | 11/2012 | Hockings et al. |

OTHER PUBLICATIONS

US Non-Final Office Action dated Oct. 2, 2014 issued in U.S. Appl. No. 13/593,257.

US Non-Final Office Action dated Mar. 13, 2014 issued in U.S. Appl. No. 13/593,274.

US Final Office Action dated Aug. 20, 2014 issued in U.S. Appl. No. 13/593,274.

* cited by examiner

TOLERANCE FACTOR-BASED SECRET DECAY

BACKGROUND

An increasing number of users are utilizing network systems and services to obtain various types of information and perform various actions. In order to ensure the security of these actions, passwords, tokens, and other security mechanisms or credentials are put into place to attempt to prevent unauthorized access. For example, information for a network session might be provided to a client device in the form of a browser cookie, where a copy of the cookie must be provided with subsequent communications on the session for purposes of authentication. It is often the case, however, that a copy of the cookie and/or the information in the cookie can be obtained by other users or devices, such as by a device intercepting a communication with a copy of the cookie or causing a message to be sent to a device that includes a copy of the cookie. Any party receiving a copy of the cookie can potentially impersonate the user and/or client device by including the copy of the cookie with a subsequent request, which can lead to any of a number of undesirable results for the user or the party to whom the user was impersonated.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing security in an electronic environment. In particular, various embodiments provide for automated variation of credentials, keys, or other secret information in order to cause current versions of the secret information to diverge from older copies of the secret information, thus reducing the ability of an unintended third party having access to an older copy from being able to access protected information and/or resources. The variation in the secret information can occur in response to any of a number of potential triggers, or an authorization system can be configured to cause the secret information to decay, or slowly change, over time such that older copies of the secret information become increasingly less useful. In at least some embodiments the authorization system can utilize cookies, such as browser cookies or Web cookies, among other types of session tokens. Each cookie can include information such as a time of issuance and an operation count, in addition to a session identifier or other such information. When a server or other network component receives a copy of the cookie with a request, the server can analyze information such as the time since the cookie was issued and the operation count relative to a current operation count in order to determine whether to authorize and/or process the request. Various approaches can be used to enable multiple valid clients on a session to continue to operate with valid, concurrent copies of the cookie. In at least some embodiments, a period of allowable inactivity on a session can decrease or otherwise adjust based on factors such as the age of the session, such that sessions can tend to expire but a session will not be terminated (at least based on session age) as long as the session is being used with at least a current frequency. Certain authentication systems can utilize a factor, such as a "badness" factor, that indicates how strict an authentication system should be for current activity and/or context related to a session. A badness factor in at least some embodiments is a measure as how far from "optimal" or "perfect" a cookie or session token can be and still be considered to be valid, such as how old the cookie can be, how long since a last operation, how far behind a current operation count, or other such aspects.

Various other functions and advantages are described and suggested below as may be provided in accordance with the various embodiments.

Figure 1:
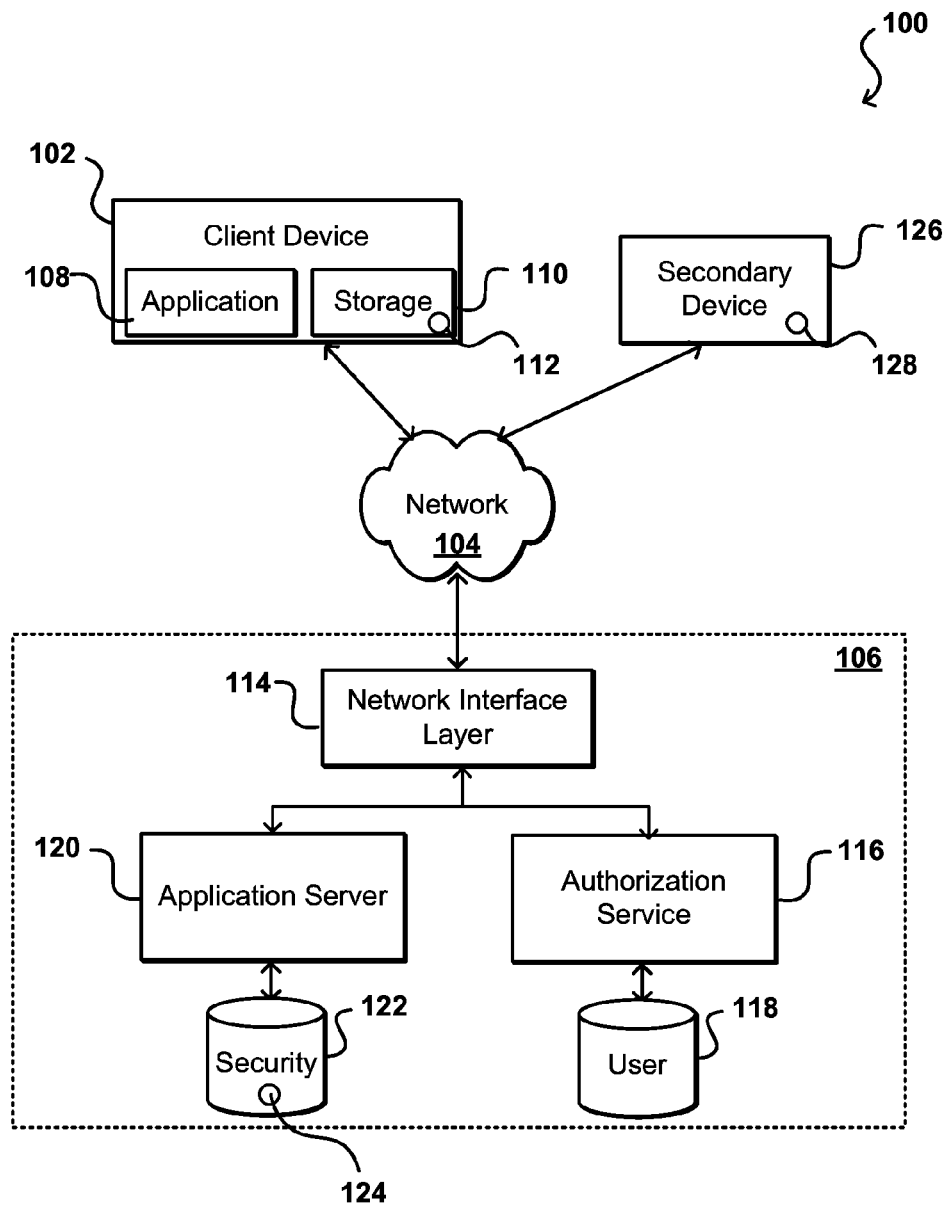
FIG. 1 illustrates an example environment in which aspects of the various embodiments can be utilized.

FIG. 1 illustrates an example environment 100 in which aspects of the various embodiments can be implemented. In this example, a client device 102 is operable to execute an application 108 that is able to send and receive requests across at least one network 104. The client device can be any appropriate computing device capable of receiving, determining, and/or processing input, as may include a tablet computer, a smart phone, an electronic book reader, a desktop computer, a notebook computer, a personal data assistant, a smart phone, a video gaming console, a television set top box, or a portable media player, among others. In at least one embodiment, the application 108 is a Web browser operable to submit requests (e.g., HTTP requests) to a destination across the Internet, as may involve multiple networks such as wired or wireless data networks, cellular networks, and the like. In the example illustrated in FIG. 1, the request can be directed to another entity, such as a resource provider 106, content delivery system, or other such entity or environment that is operable to receive and process the request, and return an appropriate response. In at least some embodiments, the resource provider can be a provider of shared resources in a multi-tenant environment, such as a "cloud" provider. The request might be directed to a Web service provided by the provider 106, for example, where the request might be received to one of a set of application programming interfaces (APIs) or other such interfaces of a network interface layer 114, which can cause information for the request to be directed to an appropriate application server 120 or other such component that includes logic and/or instructions for processing information in the request.

For many types of requests, calls, or other such transmissions over a network 104, it can be desired to authenticate a source of the request and/or protect the information in the request from being available to an unintended third party. In some embodiments, a client device 102 submitting a request to the provider environment 106 must first be authenticated to at least one component of the provider environment. In this example, the client device provides at least one security credential, such as a username, account number, password, or other such information, that is received to the network interface layer 114 and directed to an authentication service 116 or other such component, which can be part of, or separate from, the provider environment. The authorization service can compare the received credential(s) against information stored in a user data store 118 or other such location, and can determine whether to authenticate the client device and/or a user of the client device. Approaches for conventional authentication of a user or client device based upon one or more credentials are known in the art and as such will not be discussed herein in detail. As known for such purposes, the authentication might be a multi-factor authentication (MFA) that requires multiple matching credentials for the client device.

In this example, a successful authentication causes information for the request to be sent to the appropriate application server 120 or other such component to process information for the request. In at least some embodiments this requires initializing a session and generating a session identifier to be provided to the client device. In at least some embodiments, the application server 120 will provide the session identifier with other information in the form of a cookie or other secure token. A copy of the session identifier and other cookie information 124 can be stored locally, such as in a security data store 122 or other such location. A copy 112 of the cookie can also be sent across the network to be stored on the client device 102, whether in local storage 112, memory, the browser application, or another appropriate location. When the client device submits a subsequent request on that session, the request can be received to the application server 120 (or another, associated application server of the environment 106). The application server (or another appropriate component) can ensure that a copy of the cookie was included with the request, and can compare the information in the received copy of the cookie with the cookie information 124 stored locally. If the information, such as the session identifier and a key value, match the information stored locally, the request can be processed. If the cookie was not provided, or the information does not match, the client device can be forced to perform another authentication with the authorization service 116 or another such entity or component. In at least some embodiments, logged in or otherwise authenticated entities may have been provided by an external federation system or other such source.

In an approach such as that discussed above, authorization events can be classified into what will be referred to herein as "strong" authentication events and "weak" authentication events. A strong authentication event can refer to a situation where a client device provides at least one credential that is validated by a component such as a server, which then creates a session (i.e., on the server). The server provides a credential, such as a cookie for the session, to the client device. The client device can present a copy of the cookie with subsequent requests on the session to obtain access to one or more resources for the session, at least until a next strong authentication event is needed, requested, etc. It at least some embodiments the server generates and/or assigns an identifier for the session that is included in the cookie. The cookie can also include a key and an issuance time or other such time stamp or timing information.

Weak authentication events can refer to situations where a request or other communication is received with a copy of a credential, such as a copy of a cookie on a session, where that credential is used to authenticate the request. In at least some embodiments a copy of the cookie returned in response to a weak authentication event can include timing information for the last weak authentication event that happened, as well as an operation count corresponding to that last weak authentication event. Other information can be included as discussed elsewhere herein, such as fingerprint information or a badness factor, among others. The operation count can be set to zero (or another appropriate value) when the session is created in response to a strong authentication event, and the operation event incremented each time a subsequent weak authentication event occurs whereby a request is authenticated and processing performed. An example of a cookie format includes the current time stamp signed under the session key, along with the identifier for the session. When the server (or a related server) receives such a cookie, the server can look up a session corresponding to the identifier and can validate information in the cookie, such as a timestamp matching a timestamp issued by the server for this session. When the presented cookie is validated, such that weak authentication occurs, the cookie returned by the server can be encoded to include updated information, such as a new timestamp, incremented operation count, and the like. Various other approaches to including and/or encoding information in a cookie or session token can be utilized as well within the scope of the various embodiments.

As discussed, there might be multiple client devices or components submitting requests on a specific session. Each device would include a copy of the cookie with a request, where each cookie could include information such as the session identifier and key information. If the client devices are at least partially alternating in sending requests, then at least a portion of a time a client device will be submitting a request after another device has submitted a request. In such an instance, the client device submitting the later request will not be able to provide a current copy of the cookie (unless obtaining a current copy of the cookie from the other device). The timestamp of the most recent operation will be more recent than the timestamp in the older cookie, and the current operation count from the view of the server will be different from the operation count in the older cookie. Simply rejecting a request with the older cookie can be undesirable for situations where multiple client devices are legitimately submitting requests on a session, or where information such as the IP address used by a client device to submit requests might change during a session, among other such situations. It also is the case, however, that other unintended parties or secondary devices 126 might obtain a copy of the cookie 128 and attempt to submit requests on the session. In those cases, it would be desirable to be able to reject older copies of the cookie in order to minimize the impact of copies of the cookie.

Approaches in accordance with various embodiments can take different approaches with respect to determining which cookies to accept for authentication and which to reject. For example, as mentioned one approach would be to reject any cookie that does not include the most recent timestamp and a correct operation count, among other data such as the proper session identifier and session key, etc. Other approaches might allow a cookie to be accepted if a timestamp of the cookie is within an acceptable amount of time from a correct timestamp value, and if the operation count is within an acceptable amount of variation from the current operation count, such as no more than one to five operations behind the current count, and not ahead of the current count.

Approaches in accordance with various embodiments can utilize one or more functions, which in at least some embodiments are customizable, for purposes of determining an extent to which to accept cookies with outdated information. In at least some embodiments, various parameters, coefficients, weightings, or other portions of the formula might be dynamically adjusted based at least in part upon current network or contextual information.

In at least one embodiment, an acceptance time window might be adjusted over time based on factors such as the age of the session and a period of inactivity. For example, each session might have a period of inactivity defined, such that if no requests are received or operations performed for a session for at least the period of inactivity, the session can be terminated in order to prevent a number of sessions from existing concurrently that can consume resources but are no longer needed for a given task, client, etc. The period of inactivity can be any appropriate time, based on any appropriate factor, such as one second, ten seconds, thirty seconds, sixty seconds, ten minutes, etc. The longer a session is active, however, the more likely it is that a cookie or other session credential will fall into the hands of an unintended party or other such person or device. In at least some situations, it might be desirable for these periods of inactivity to decrease with the age of the session. A session might be terminated after a determined lifetime, in order to reduce the effectiveness of other copies of a cookie and prevent an unnecessary usage of resources, among other such options. When users are frequently using a session, however, it can be undesirable to cause the user to stop in the middle of an operation and login again, or otherwise provide credentials, in order to obtain a strong authentication event and initiate a new session.

In at least one embodiment, when a strong authentication occurs and a session is initiated, a cookie is issued with a timestamp and an appropriate server will accept a copy of that cookie as authentication as long as the copy is received within the default period of inactivity, such as within five minutes for a cookie for a public Web site. A function can be defined that determines how much that period of inactivity changes with the age of the session. The function can be a linear or non-linear function, step-function, etc., and for non-linear or step functions can decrease more or less rapidly over time. For example, a session might have a default lifetime of an hour. Since the default inactivity period is five minutes, the function might not change appreciably for the first five minutes. After the session has been active for an hour, the allowable period of inactivity might have decreased to on the order of tens of seconds. Between those times, the period can decrease using any appropriate function. For "expensive" resources or during periods of peak activity, a function might be selected that decreases exponentially, either decreasing more or less rapidly over an initial period with respect to a later period during the lifetime. In this way, a cookie that is received ten minutes into the lifetime of a session might be accepted if the cookie is within four minutes of the last activity timestamp for the session, but might have to be received within one minute of the last activity when thirty minutes into the session. Various other options and values can be utilized as well.

A similar approach can be used for operation count, or other such information. In some embodiments, a timestamp function might also be used to determine how far "behind" the operation count in a received cookie is able to get before the cookie is rejected, regardless of the amount of time since the cookie was issued. For example, a cookie might have to have an operation count within five of the current value in order to be accepted. In other embodiments, this number might vary over time. For example, the number of operations that a cookie can fall behind while still being considered valid can decrease with the lifetime of the session, such that towards the end of the session the cookie might, at most, be able to fall one operation behind, if allowed to fall behind at all.

In at least some embodiments, any time a cookie is received that falls within the allowable parameter range for a successful authentication, a copy of the cookie can be returned that contains a current timestamp and a current operation count. In certain cases where the request may have come from a questionable source, such as where the cookie contained information near the outer limits of the allowable range, it might be undesirable to provide an updated copy of the information and instead allow the potentially compromised copy of the cookie to diverge from a current copy with the correct information. Accordingly, approaches in accordance with various embodiments might increment the operation count in the cookie returned for the request, such that if the source is valid the source will be able to submit another request (if submitted within the allowable range, etc.). If the count was five behind and the limit is five behind, falling any more behind will cause that cookie to no longer work for authentication. Such an approach can help the compromised cookie to diverge if other copies, correct or compromised, are also being used to submit requests on the session.

Other information can be used as well to determine whether to provide a current count, or current information, or whether to instead increment the values that are received with a cookie. For example, information about a client device might be collected and stored in order to generate a "fingerprint" or (relatively) unique identifier for that device. The information can include any information that might be used to identify a specific client device, and which at least for Internet-related tasks is exposed to a Web browser or other such application, such as may include a client IP address, browser version information, plug-in identifiers and version information, information about a user agent, or an aspect of the request, among other such options. Such information can be used to determine whether the source of the current request is likely the same as the source of one or more previous requests.

In at least some embodiments, a server or network environment can take advantage of what will be referred to herein as a "ring buffer," or other buffer or cache that stores information using a first-in, first out (FIFO)-based approach, for example. In at least some embodiments, the buffer can store fingerprint information for a source associated with a most recent number of requests, such as up to the ten most recent requests on a session. When a request is received on the session, a determination can be made as to whether the request is from the same source or a different source from previous requests, or whether the client device might have changed in some way. For example, a client might upgrade software or reboot a router, which might change a software version or affect a network address or port, among other such options.

In at least some embodiments, a source for a request might have to match at least a minimum number of entries in the ring buffer for the session, at least within an acceptable amount of deviation, to be authenticated and/or to receive current information for the session. If the source appears to be a client from a majority of the requests having information stored in the ring buffer, the cookie can be authenticated and a returned cookie can include the most recent count and timing information, among other such options. If, on the other hand, the cookie is accurate enough to be authenticated but does not match a majority (e.g., 5, 8, etc.) of the entries in the ring buffer within an acceptable amount of deviation, the returned cookie might include only an incremented version of the received cookie information. In other words, if the client device associated with a request appears to be the correct client device then a completely fresh and accurate cookie can be provided that includes current information for the session. If, on the other hand, something has changed or does not match, the cookie that is returned might include only an incremented version of information, such that the cookie for that client device will tend to diverge from a current copy of the cookie if the correct device is also submitting requests.

In some embodiments, the amount that an operation count is incremented might vary based at least in part upon the type of operation. For example, if the operation is a highly sensitive operation that causes personal or confidential information to be stored on the session, the operation count might be incremented more than one such that the correct current count is higher than would result from a normal operation, causing older copies of the cookie for a session to diverge more quickly. Other factors might affect the amount a count is incremented as well, as may include the value of an operation, how closely the fingerprint matches fingerprints in the ring buffer, or other such information. The incremental or periodic adjustment of secret information such as keys, operation counts, and other such information is sometimes referred to herein as "decaying," as the amount that a current value differs from a specific previous value will increase over time, such that the usefulness of a previous cookie or token to an unauthorized client device, server, or other such component or entity decreases over time.

Figure 2:
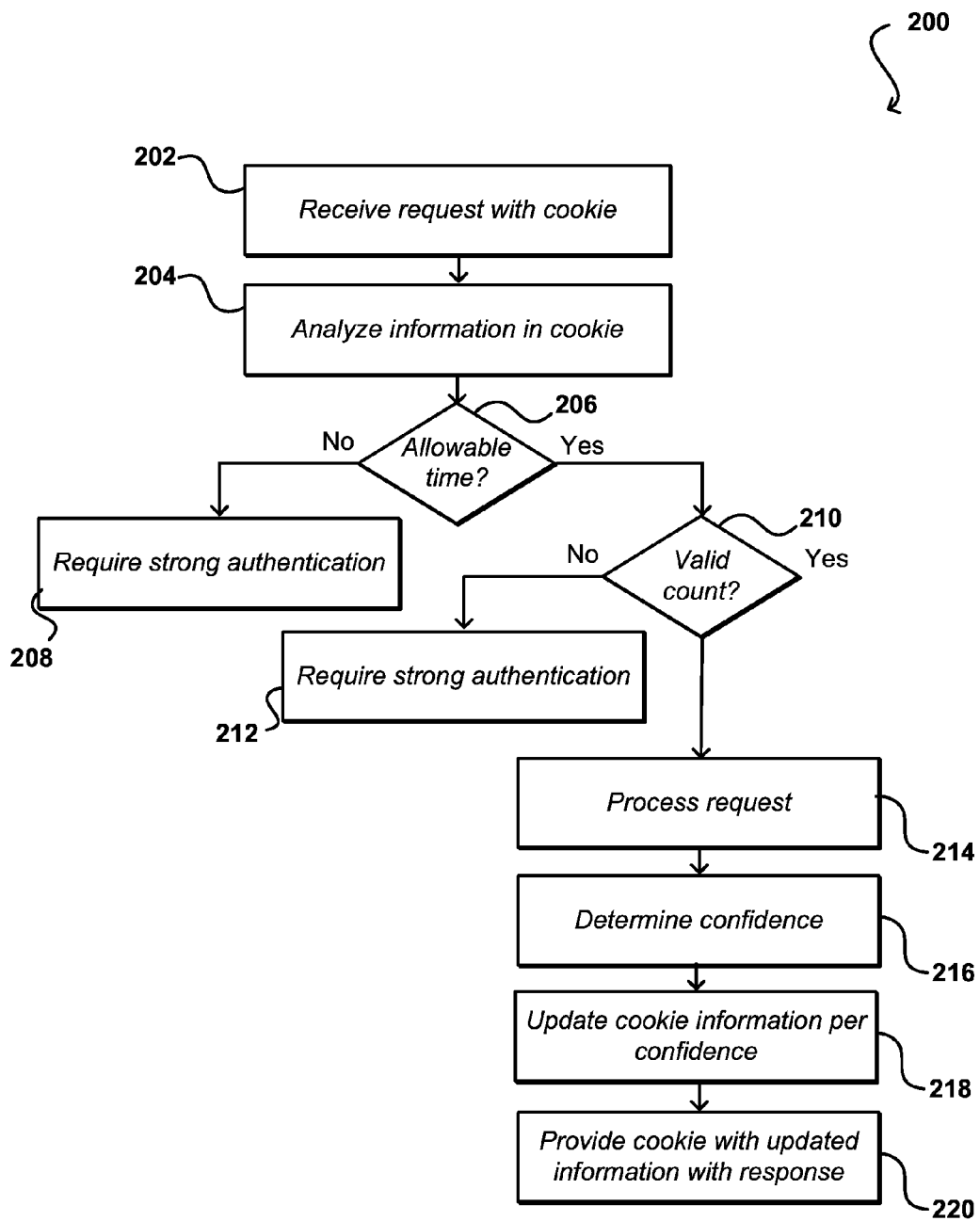
FIG. 2 illustrates a first example process for managing authentication information that can be utilized in accordance with various embodiments.

FIG. 2 illustrates an example process 200 for managing security information in an electronic environment that can be utilized in accordance with various embodiments. It should be understood that there can be fewer, additional, or alternative steps performed in similar, or alternative, orders within the scope of the various embodiments unless otherwise stated. Further, although this and other examples discussed herein relate to a client device and an application server, it should be understood that the examples can apply to other appropriate senders and recipients as well within the scope of the various embodiments. In this example, a request is received 202 that includes a cookie. The information in the cookie is analyzed 204, which in at least some embodiments might include using a key to extract information that was signed with the key, and ensuring that the proper key was used to sign the information. A determination can be made 206 as to whether a timestamp in the cookie, such as a time at which the cookie was issued, falls within an allowable period of time from the current time. If not, a strong authentication request may be required 208 before the request can be processed. If no strong authentication event occurs, the request may be rejected. Another determination can be made 210 as to whether an operation count contained in the cookie is within a valid range of the current operation count of the server or other component receiving the cookie. If the count is outside a valid range, such as by being ahead of the current count or too far behind the current count, a strong authentication request 212 can be required in order to process the request.

If the count and timing information in the cookie are determined to be valid or acceptable, and if any other relevant criteria are met, the request can be processed 214. In at least some embodiments, a confidence or similar value or factor can be determined 216. Such a value can be determined based on factors such as how many clients are submitting requests on the session, how close the received cookie information was to the correct information, and other such factors. Based at least in part upon the confidence level, the cookie information for the client device submitting the request can be updated 218. As discussed, a high confidence level might mean that the cookie information (e.g., operation count) is updated to a current value, while lower confidence levels might mean that the values in the received cookie are updated or incremented, but not necessarily set to the current values. A copy of the cookie with the updated information encoded therein then can be returned or provided 220 in a response with information resulting from the processing.

In some environments, multiple client devices might be submitting requests on a session, and it would be desirable for the fingerprints for those devices stored in the ring buffer to appear to correspond to the same client device, such that each of those devices submitting a request can be likely to receive a current copy of the session information in a received cookie. In at least some embodiments, a similarity function can be used to determine whether client devices should be treated as a single device. For example, there might be two Web servers for a client environment that have different IP addresses but act like clients sending requests. It can be desirable in at least some embodiments to describe these devices in a way that causes them to count like a single device in the ring buffer. In at least some embodiments, a masking function can be used on a fingerprint for a device to cause those fingerprints to appear the same in the ring buffer for purposes of advancing operation count, or other such session information. The masking function can be any appropriate characteristic function of the client that might be based at least in part upon any network address, user agent, or other such information to generate a signature or fingerprint for a device, which will be submitted into the ring buffer for purposes of determining proportions.

In one example, a characteristic function might allow a certain amount of input variation that will result in the same characteristic output. For example, an IP address component might have the least significant bits masked out such that an entire address block can be combined into a single address value for the fingerprint. The masking can be selected to include as few addresses outside the control of a specific user or client as possible. In this way, three devices from the same company might be able to submit requests on a session that count as three instances of the same device in the ring buffer, such that those devices each appear to have a majority when a request is received and can thus each likely receive a current version of the cookie in response to a weak authentication event. In some embodiments, the addresses associated with certain clients or types of request might be monitored to determine ranges of addresses that should be considered as potentially valid, as a provider or other entity might move addresses within that range for requests from a given client. Other information can be used as well, such as geo-location data, signature mapping, etc.

Figure 3:
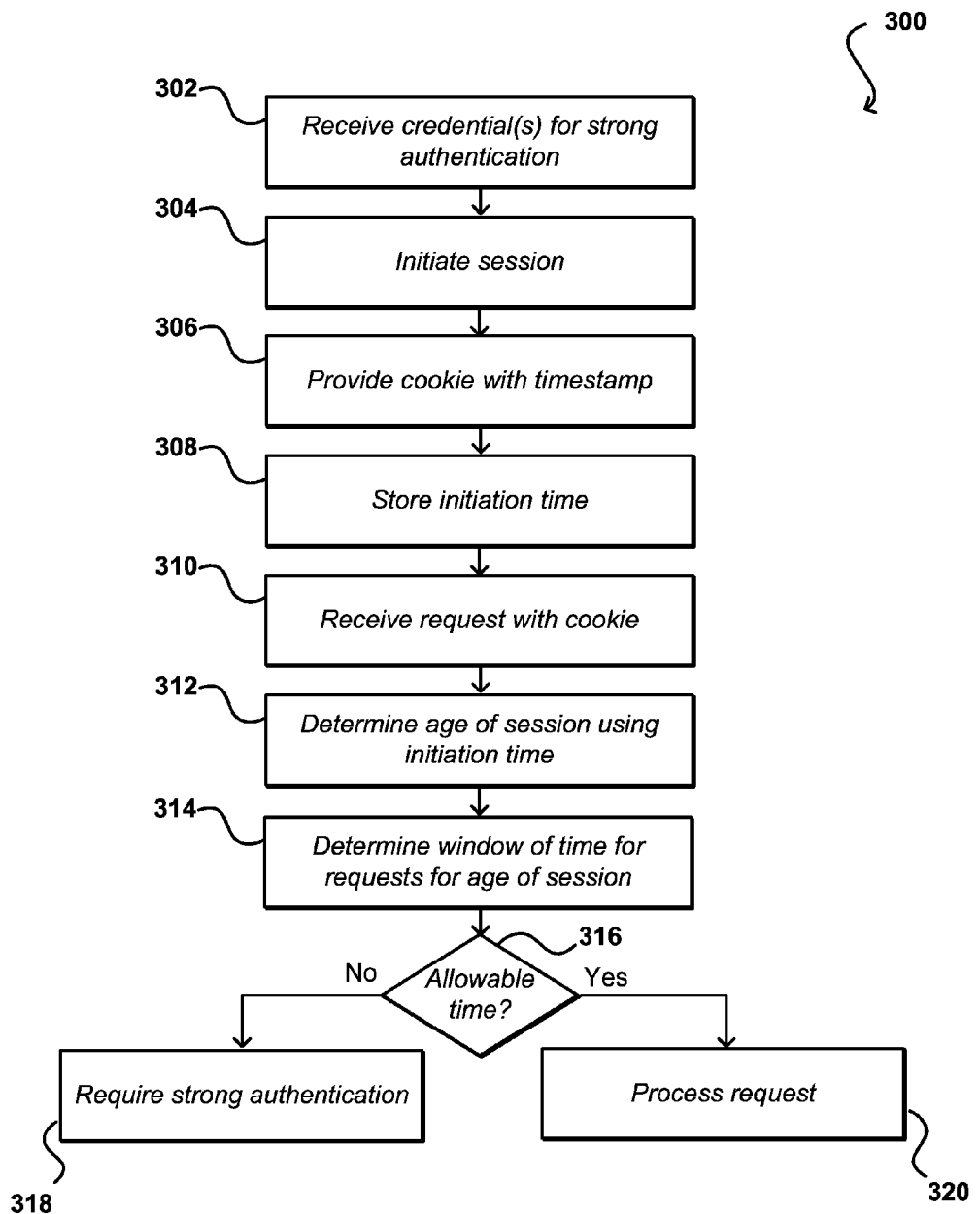
FIG. 3 illustrates a second example process for managing authentication information that can be utilized in accordance with various embodiments.

FIG. 3 illustrates an example process 300 for determining whether to authenticate requests based at least in part upon an adaptive time window that can be used in accordance with various embodiments. As discussed above, at least some of these steps can be performed in different orders, or in parallel, within the scope of the various embodiments. In this example, one or more credentials are received 302 that are able to be used to provide for a strong authentication of the sender of the credentials, such as may include a client device. In response to the strong authentication, a session can be initiated 304 (if not already existing, in at least some situations) and a cookie can be provided 306 back to the sender of the credential(s), such as the client device. In addition, an initiation time associated with the start of the session can be stored 308 for subsequent retrieval and/or analysis.

At a later point in time another request can be received 310 from the sender, where the request includes a copy of the cookie. In response, the appropriate session can be determined using a session identifier or other such information from the cookie, and an age of the session can be determined 312 based at least in part upon the initiation time. A current window of time for requests on the session can be determined 314 based at least in part upon the age of the session, as in at least some embodiments the window of time can decrease with age of the session according to at least one decay function or other such algorithm. A determination then can be made 316 as to whether the cookie was received within the current time window with respect to the timestamp included in the cookie, a local timestamp for a last received operation, or another appropriate value. In some embodiments there can be more than one time window, such as a window for an allowable period of inactivity and a window for an allowable period of use for a specific copy of a cookie, among other such windows. If the cookie was received outside the allowable time window, another strong authentication might be required 318 before the request can be processed. If the cookie was received within the allowable window, the request can be processed 320 and the cookie information updated accordingly.

It should be understood that, although many of the examples discussed herein refer to a client device submitting requests that are authenticated by a server or similar component, that in at least some embodiments communications from a server can be used to authenticate the server to a client device or other such component. In at least some of these cases, the client device can control decay or variation of the session information, which can be desirable in situations such as where the server makes requests on behalf of the client device, among other such situations.

As mentioned, certain embodiments can also take advantage of what is referred to herein as a "badness" factor, or "tolerance" factor. Each session, or at least a subset of sessions or type of session, can have a badness factor assigned, calculated, or updated that indicates how tolerant the session should be to incorrect information. The badness or tolerance factor thus can cause information received in a cookie to be tested more stringently or expire sooner, among other such options. As discussed, an authentication system (or service, etc.) can include an adaptive band of parameter values that the system will accept when received in a cookie for a request, where the parameters include information such as timestamp or operation count. The tolerance factor can be thought of as a coefficient or weighting factor that determines how wide the band should be for the current session and the present time. The tolerance factor can be indicative of potentially hostile traffic. As the tolerance factor changes and the width of the band decreases, older and/or incorrect versions of the cookie will tend to diverge more quickly, and will be less likely to be accepted. In at least some embodiments, each successful weak authentication can cause the tolerance factor to increase (or badness factor to decrease), while each unsuccessful authentication attempt or successful attempt with values near the edge of the band can cause the tolerance factor to decrease (or badness factor to increase). As used herein a higher tolerance factor makes the system more tolerant to deviations, while a higher badness factor is indicative of potential mischief and can make the system less tolerant to deviations. Various other such factors can be used as well.

The width of the band can be continuously updated in order to account for different types of information that might be outside the width of the band. For example, there can be information that is far outside the allowed band which no correct or valid client would have generated. This can be strongly indicative of something fishy going on, and the badness factor can be increased significantly. There also can be information that is just outside the allowable band. Such values might be generated by an entity that is nearly successful in obtaining unapproved access, or by a client device that is experiencing slightly abnormal or unusual behavior and is submitting information completely correctly. It therefore can be desirable in at least some embodiments to track the trending of the "correctness." For example, if incorrect requests are being submitted that are getting closer to being correct, it can be indicative of an intelligent attack such that the badness factor might be increased significantly, even to the point where the session is to be shut down, as no cookies will be accepted as valid. If an entity is repeatedly submitting incorrect information, the badness factor might be increased. Since the entity is not making progress, however, the badness factor might not be increased as rapidly as where the client device seems to be obtaining session information and using that information to improve the quality of the session information submitted with the cookies, particularly where the information being provide to the client device should not cause that client device to be submitting increasingly more accurate information. In some embodiments, a high badness factor might mean that only a single operation on a session can be processed at any time, and each operation has to include correct information, and any deviation will cause the session to be shut down.

Figure 4:
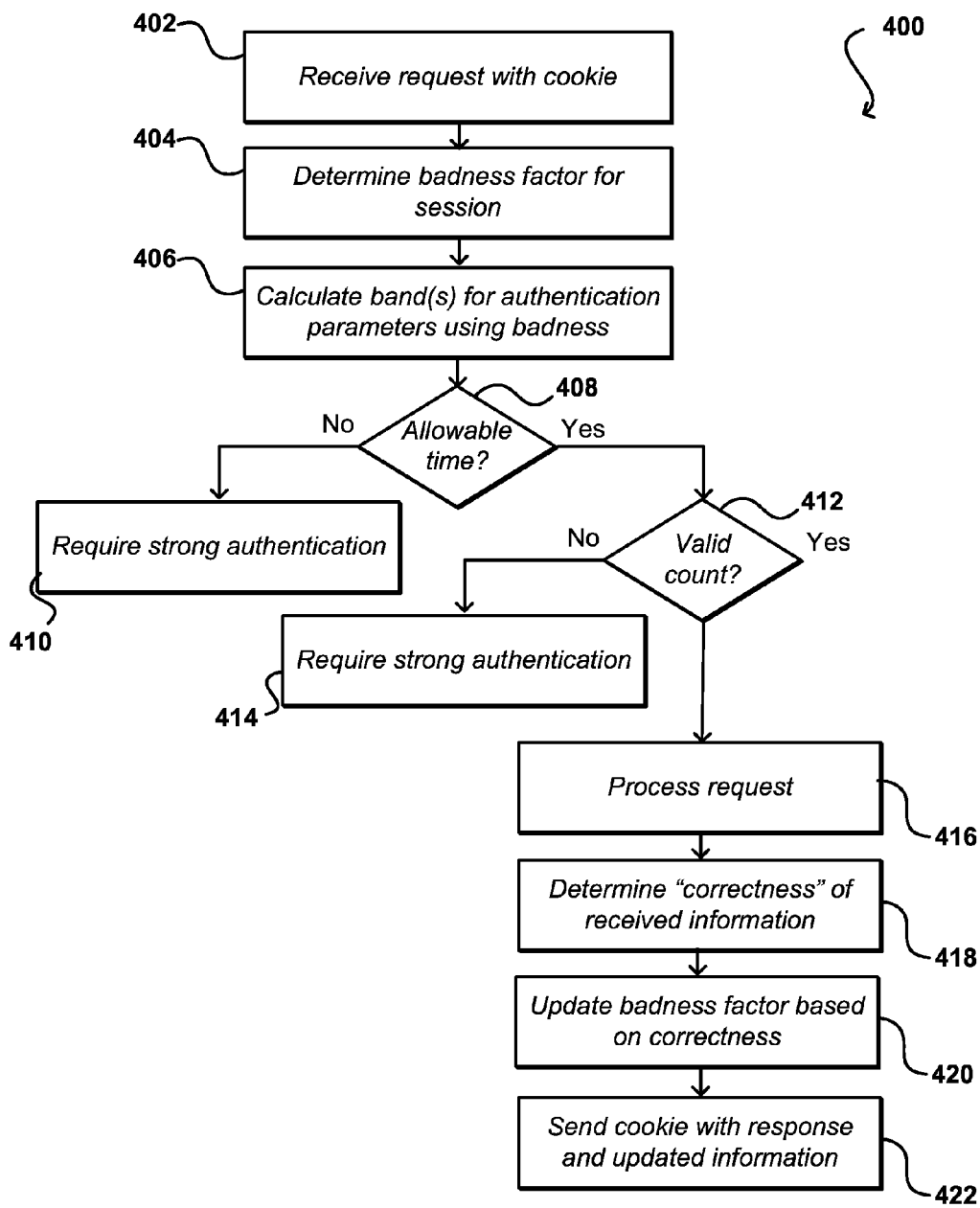
FIG. 4 illustrates a third example process for managing authentication information that can be utilized in accordance with various embodiments.

FIG. 4 illustrates an example process 400 for dynamically adjusting acceptable bands of authentication parameters that can be used in accordance with various embodiments. In this example, a request is received 402 that includes a cookie. In response to receiving the cookie (and determining the cookie to be signed with a valid key or other such steps), a determination can be made 404 as to a current badness factor for a session associated with the cookie. As discussed, tolerance factors or other such values can be determined as well within the scope of the various embodiments. Upon determining the current badness factor to apply, one or more bands can be calculated 406 for the one or more respective parameters to be used in authenticating the request. These can include, for example, an amount of allowable inactivity time or a number by which the cookie information can fall behind the current operation count, among other such options. Upon calculating the bands, a determination can be made 408 as to whether the cookie was received within the calculated allowable inactivity time band since the last operation on the session. If not, a strong authentication event can be required 410 in order to process the request. A determination also can be made 412 as to whether the operation count of the received cookie information falls within the band of count variation for the session. If not, a strong authentication event can be required 414 in order to process the request. If the values for at least these two parameters fall within the calculated bands in this example, the request can be processed 416. Further, a "correctness" or other such measure of the received cookie information can be determined 418. Cookie information that exactly matched the current value can result in a high correctness score, information falling near the edge of the calculated bands might result in a medium correctness score, and information falling outside the calculated band can result in a low correctness score. Various other types of information and values can be utilized as well within the scope of the various embodiments. An updated badness factor then can be calculated 420 based at least in part upon the correctness value. For example, a lower correctness score might result in a higher badness score, which can cause older versions of the cookie to diverge more quickly going forward. For instances when the request was processed, the badness factor can be used to determine an extent to update the cookie information, such as whether to provide correct or incremented information values, and the updated cookie information can be sent 422 with the response to the original requestor (e.g., the client device).

In some embodiments a weak authentication can be based at least in part on the state encoded in the cookie as well as the server-side state. The server-side state can be allowed to mutate over time, such as to vary the key used for a session, as a weak authentication function can be configured to test variants of the key. In some cases the server will give an accurate copy of the key, or other secret information, to the client and the information will not change before a request is received from the client, which provides a straightforward authentication event. In a second case, the server may have changed at least a portion of the secret information, such as to mutate one or more of the bits over time. There also could have been another request received from a different client that caused the server-side state to mutate. The authentication function in such an instance would have to determine whether to allow the weak authentication based on the type and/or amount of difference between the secret information received from the client and the secret information stored for the server-side state.

In some embodiments a server might deliberately provide a "corrupted" or incorrect version of the secret information to a client device. In embodiments where there is a band of acceptable secret values or cookie information, for example, the cookie information can be set to one or more values close to the edge of the band, intentionally varied from the current values. The amount that the information varies from the accurate values can be based at least in part upon a current tolerance factor value, an amount of trust in the client device, or other such information. For example, if there is a multi-factor authentication (MFA) mechanism available and the client devices provides only a portion of the credentials for MFA, such as a token but not an associated password, the system might provide credentials that are only good for a very limited set of resources and set near the edge of the band, such that the copy will be highly likely to diverge unless another valid authentication is received.

In some embodiments, a perfect copy of the secret information might only be provided in response to a strong authentication event, when the badness factor is below a certain threshold value, etc. It is also possible that for a weak authentication event the cookie or other secret information provided to the client is updated to a correct or current state, or to something that is closer to current but not quite correct. In an embodiment with a ring buffer where the client has a super-majority, such as at least 80%, of the buffer, the information might be updated to correct. If the client only has at least a simple majority, such as at least 50%, then the information might be updated or incremented, but not set to the current state.

In some embodiments, at least a portion of the authentication process can also (or alternatively) be performed on the client device. Such an approach can help to ensure that client devices do not inadvertently communicate information with malicious servers or other such components. In some embodiments, there might be a set of servers sharing cookie space. The client device can give each server a set of credentials that are close but not quite current or correct, and marginal enough that the credentials would not be accepted to, or from, one of the other servers. Further, the copies can diverge over time as with the other cookies or secrets discussed herein. In some cases none of the servers would get the actual value of the secret or authenticator stored by the client, but would each get a secret derived from that authenticator. Such an approach also can be useful for a system where a server is communicating with other servers on behalf of the client device. The decaying of the secret information obtained by a server can reduce its ability to communicate on behalf of the client device over time. As with other approaches, a distance function can be used to determine how far the information in the copy of the cookie is from the current information, and if the information is determined to be too far from the correct values, the copy can no longer be accepted for authentication and a strong authentication may be required for that client device.

In at least some embodiments the server might periodically add bits to a key over time, and the rate at which bits are added or otherwise manipulated can depend at least in part upon the type of requests received by the server, the current value of the badness factor, and other such information. In cases where the client device manipulates the key, the server might require the client device to add or update bits to the key at a certain rate, as a malicious client in general might intentionally not diverge its copy of the key, as the client device might not have an accurate version or might otherwise cause its version of the key to no longer be accepted by the server. In some embodiments, a server might require a client device to adjust a minimum rate of motion on key bits in response to a change in state, such as an increase in badness factor, information for that client device not appearing a majority of the time in the ring buffer, etc. In some embodiments, a storage mechanism such as HTML5 local storage can be used with JavaScript or another active scripting language to periodically mutate the key bits kept in local storage. The server could search for a certain prefix and suffix of the current key, for example, in case the current request was in flight before resynchronization of the key. The mutation of the key can occur in response to any of a number of triggers, such as one or more requests or operations, a passage of an amount of time, a change in a state or badness factor, etc. In some cases the client and server might both vary the key over time and require resynchronization in response to an authorization event, or other such occurrence. In at least some embodiments, a server-side deterministic function can be used to determine how often to vary the bits, as well as how much to vary the bits.

In some embodiments, the amount which bands or badness factors are adjusted, or session parameters incremented, can depend at least in part upon a type of user, client, operation, or other such aspect. For example, certain customers or operations might have higher security levels or agreements, such that older copies of secure information should diverge more quickly than for other customers or operations in the event of suspicious activity. Other information can be used as well. For example, if a user is attempting to ship an item to an address that has not been received before or access a financial account, the bands of acceptable parameter values might be much tighter than for standard operations. For certain types of activity, a strong authentication might be required even where correct credentials were provided. Various other approaches can be used as well within the scope of the various embodiments.

Figure 5:
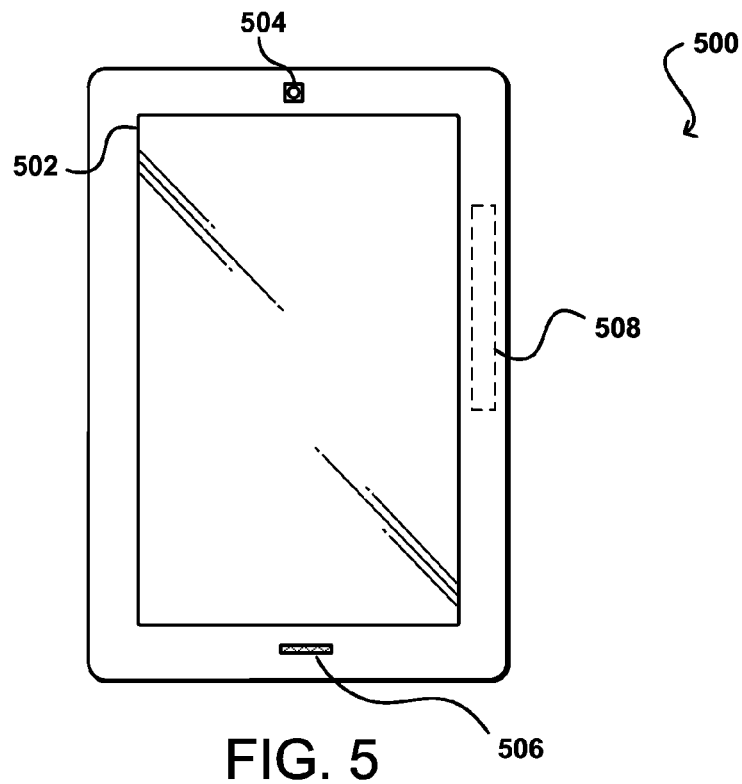
FIG. 5 illustrates an example client device that can be used to implement aspects of the various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 502 operable to display information to a user facing the display screen (e.g., on the same side of the computing device as the display screen). The computing device can include various elements enabling a user to provide input to the device, such as a touch-sensitive display screen 502, at least one camera 504, a microphone 506, a keyboard or touchpad, or other such elements. The example computing device 500 also includes at least one communication mechanism 508 enabling the device to send and receive communications over at least one network. These networks can include, for example, a local area network (LAN), the Internet, an intranet, a cellular network, a wireless data communications network, and the like. In some embodiments, the computing device can also include at least one secure input LED or other such element operable to indicate when input is currently being fed into the BSM, as opposed to "normal" input.

Figure 6:
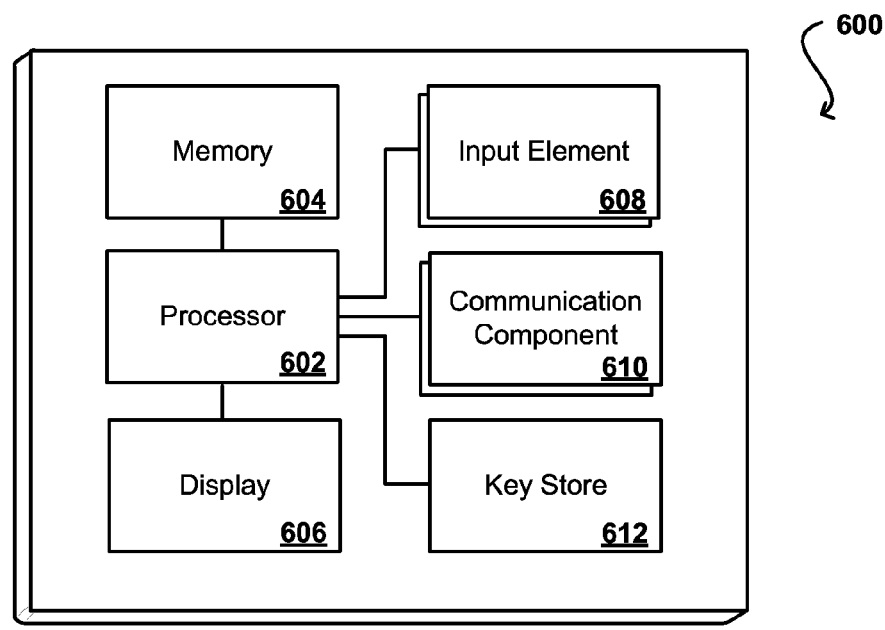
FIG. 6 illustrates example components of a client device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more communication elements 610, such as a Wi-Fi, Bluetooth, RF, wired, or wireless communication system. The device in many embodiments can communicate with a network, such as the Internet, and may be able to communicate with other such devices. The device 600 also can include at least one key store 612, which can be implemented through hardware and/or software. The key store can be a portion of memory, a portion of a local data store, etc. Access to the key store can be restricted to one or more applications, components, users, etc.

Figure 7:
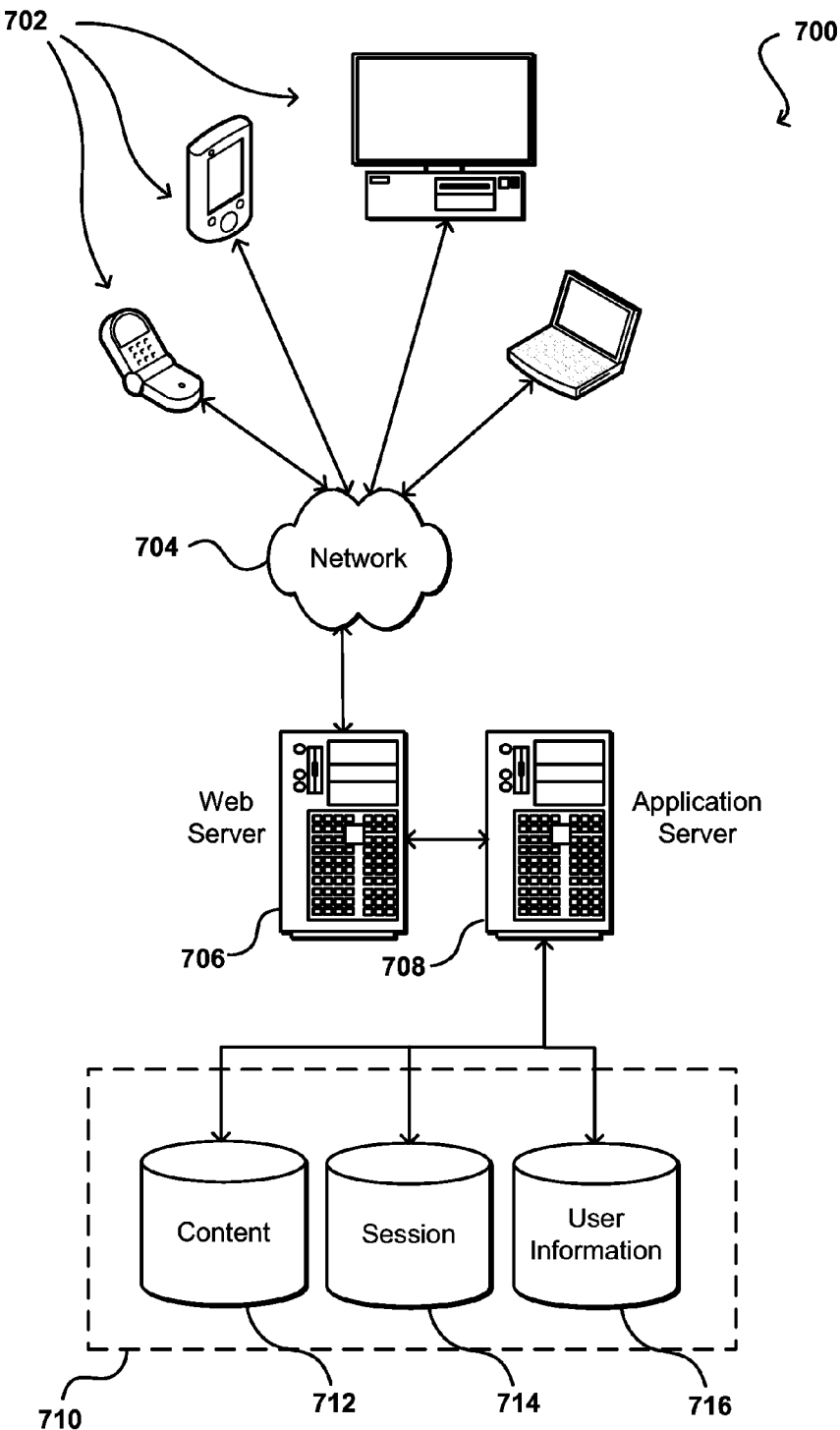
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for managing session information, comprising:
   at least one processor; and
   memory storing instructions that, when executed by the at least one processor, cause the system to:
   receiving a first request including at least one security credential for a client device;
   in response to authenticating the client device using the at least one security credential, providing a response including a session token, the session token including at least a timestamp and an operation count for the session, the operation count for the session configured to be updated in response to operations performed for the session;
   receiving a second request including the session token;
   decreasing the value of a tolerance factor without processing the request when at least one of the timestamp falls outside the first allowable range of the current time for the session or the operation count from the session token falls outside the second allowable range of the current operation count for the session, the first and second allowable ranges each being determined based at least in part upon the tolerance factor for the session; and
   when the timestamp falls within a first allowable range of a current time for the session and the operation count from the cookie falls within a second allowable range of a current operation count for the session:
   processing the second request;
   increasing a value of the tolerance factor if the tolerance factor is below a maximum value; and
   sending a response to the second request including an updated session token, the updated session token including an updated timestamp and an updated operation count.

2. The system of claim 1, wherein increasing the value of the tolerance factor increases at least one of the first allowable range or the second allowable range.

3. The system of claim 1, wherein a value of the updated operation count in the session token is based at least in part upon the tolerance factor.

4. The system of claim 3, wherein the operation count in the session token is updated to a current count for the session when the value of the tolerance factor is above a tolerance threshold, and wherein the operation count in the session token is incremented from a previous value of the operation count in the session token when the value of the tolerance factor is below a tolerance threshold.

5. A computer-implemented method, comprising:
   receiving a request from a client device, the request including a session token;
   determining at least one session parameter value for the session token;
   determining a tolerance factor for a session associated with the session token;
   determining whether the session token is acceptable based at least in part on the at least one session parameter value and the tolerance factor, wherein the tolerance factor is increased when the session token is acceptable, and wherein the tolerance factor is decreased when the session token is not acceptable;
   processing the request when the session token is determined to be acceptable; and
   updating the tolerance factor based at least in part upon whether the session token is determined to be acceptable.

6. The computer-implemented method of claim 5, wherein an amount the tolerance factor is updated depends at least in part upon how close the session token is to being determined to be acceptable.

7. The computer-implemented method of claim 5, further comprising:
   providing a response to the client device upon processing the request, the response including an updated session parameter value, the updated session parameter value determined at least in part upon the updated tolerance value.

8. The computer-implemented method of claim 5, further comprising:
   storing information for up to a determined number of most recently received requests, wherein the value of the tolerance factor is further based at least in part upon a number of times information for a device associated with the received request appears in the stored information.

9. The computer-implemented method of claim 8, further comprising:
   masking at least a portion of identifying information for one or more devices such that the devices appear as a single device in the stored information.

10. The computer-implemented method of claim 5, wherein the value of the tolerance factor decreases with an increase in age of the session.

11. The computer-implemented method of claim 5, further comprising:
    monitoring how values for subsequent requests that are determined to not be acceptable compare to values for the at least one session parameter; and
    adjusting the tolerance factor based at least in part upon how much the values differ from the at least one session parameter.

12. The computer-implemented method of claim 5, wherein the session parameter includes an operation count, the operation count for the session being updated in response to operations performed on the session.

13. The computer-implemented method of claim 5, further comprising:
    determining an amount of time that has passed between a timestamp of the session token and a current time; and
    processing the request only when the amount of time falls within an inactivity limit, the inactivity limit being determined at least in part upon the value of the tolerance factor.

14. The computer-implemented method of claim 5, wherein the session token includes a Web cookie capable of being stored by a browser executing on the client device.

15. The computer-implemented method of claim 5, further comprising:
    receiving an initial request from the client device, the initial request including at least one security credential for the client device;
    in response to authenticating the client device using the at least one security credential, providing the session token to the client device, the session token including an initial value for the session parameter.

16. The computer-implemented method of claim 5, wherein the tolerance factor is further based at least in part upon a type of operation to be performed for the request.

17. A computing device, comprising:

at least one processor; and a memory device including instructions that, when executed by the at least one processor, cause the computing device to:

receive a request including a session token;

determine at least one session parameter value stored in the session token;

determine a tolerance factor for a session associated with the session token;

determine whether the session token is acceptable based at least in part on the at least one session parameter value and the tolerance factor, wherein the tolerance factor is increased when the session token is acceptable, and wherein the tolerance factor is decreased when the session token is not acceptable;

process the request when the session token is determined to be acceptable; and update the tolerance factor based at least in part upon whether the session token is determined to be acceptable.

18. The computing device of claim 17, wherein the tolerance factor is increased when the session token is determined to be acceptable and decreased when the session parameter is determined to not be acceptable, and wherein an amount the tolerance factor is updated depends at least in part upon how close the session token is to being determined acceptable.

19. The computing device of claim 17, wherein the instructions when executed further cause the computing device to:

provide a response upon processing the request, the response including at least one updated session parameter value, the updated session parameter value determined at least in part upon the updated tolerance value.

20. The computing device of claim 17, wherein the tolerance factor is further based at least in part upon a type of operation to be performed for the request.

21. The computing device of claim 17, wherein the instructions when executed further cause the computing device to:

determine an amount of time that has passed between a timestamp of the session token and a current time; and process the request only when the amount of time falls within an inactivity limit, the inactivity limit being determined at least in part upon the value of the tolerance factor.

22. A non-transitory computer-readable storage medium including instructions that, when executed by at least one processor of a computing device, cause the computing device to:

receive a request from a client device, the request including a session token;

determine a session parameter value stored in the session token;

determine a tolerance factor for a session associated with the session token;

determine whether the session token is acceptable based at least in part on the at least one session parameter value and the tolerance factor, wherein the tolerance factor is increased when the session token is acceptable, and wherein the tolerance factor is decreased when the session token is not acceptable;

process the request when the session token is determined to be acceptable; and update the tolerance factor based at least in part upon whether the session token is determined to be acceptable.

23. The non-transitory computer-readable storage medium of claim 22, wherein the instructions when executed further cause the computing device to:

determine an amount of time that has passed between a timestamp of the session token and a current time; and process the request only when the amount of time falls within an inactivity limit, the inactivity limit being determined at least in part upon the value of the tolerance factor.

24. The non-transitory computer-readable storage medium of claim 22, wherein the tolerance factor is further based at least in part upon a type of operation to be performed for the request.

* * * * *